United States Patent [19]

Guibert

[11] 4,047,501
[45] Sept. 13, 1977

[54] DEVICE FOR KEEPING LIVE CHINCHILLA

[76] Inventor: Gaëtan Guibert, 9 Rue de Montesson, 95870 Bezons, France

[21] Appl. No.: 667,640

[22] Filed: Mar. 17, 1976

[30] Foreign Application Priority Data

Mar. 17, 1975  France .............................. 75.08266

[51] Int. Cl.² .......................................... A01K 13/00
[52] U.S. Cl. ...................................... 119/17; 119/159
[58] Field of Search .................. 119/17, 15, 1, 18, 159

[56] References Cited

U.S. PATENT DOCUMENTS

| | | | |
|---|---|---|---|
| 2,653,569 | 9/1953 | Forester | 119/18 |
| 2,713,321 | 7/1955 | Keen | 119/1 |
| 3,018,760 | 1/1962 | Tate | 119/17 X |
| 3,254,627 | 6/1966 | Cross | 119/17 |

FOREIGN PATENT DOCUMENTS 1,187,907  4/1970  United Kingdom .................. 119/17

Primary Examiner—Jay N. Eskovitz

Attorney, Agent, or Firm—Burgess, Ryan and Wayne

[57] ABSTRACT

A device for keeping chinchilla, used in combination with a cage for an animal, comprises a cylindrical container closed at its two ends by two respective side walls, and rotatively mounted, with its axis in a horizontal position, in such a way that said axis is substantially located in the plane defined by one of the sides of the cage and that said container closes said side of the cage. Said container has a longitudinal opening in its peripheral wall for allowing the animal to enter the container, and a longitudinal inner wall defining within the container one longitudinal small compartment and one longitudinal large compartment communicating with said longitudinal opening. The inner wall has longitudinal imperforate portion adjacent said inner wall edges connected to said edge of the longitudinal opening of the container, and a perforated portion. Said device further comprises positioning means for bringing said container into various preselected angular positions about the axis of said cylindrical container.

5 Claims, 2 Drawing Figures

DEVICE FOR KEEPING LIVE CHINCHILLA

The present invention is related to a device for keeping live chinchilla and more particularly to a device adapted to be used in combination with a cage wherein a chinchilla is kept.

It is well known that the chinchilla has an instinctive trend to keep its fur in a clean, degreased state, and that it uses, to this end, sand wherein it enters, whenever available, to have what is currently called a "sand-bath". The animal thus keeps its fur in a healthy shining condition.

Up to now, in the field of breeding and keeping chinchilla, it has been a current practice to use any convenient type of containers, such as boxes or cans, which were filled with sand and introduced into the cage wherein the animal was kept so as to enable the latter to have its sand baths. This method is disadvantageous in that it involves the necessity of periodically withdrawing the container with a view to cleaning the sand, e.g. by screening or sieving, or to replacing the sand, as the latter is polluted, especially by excretions of the animal. These sand cleaning or replacing operations involve a considerable loss of manpower, especially in large chinchilla farms.

It is an object of the instant invention to provide a device which overcomes the drawbacks of the known installations.

According to the invention, a device for keeping chinchilla adapted to be used in combination with a cage containing the chinchilla or similar animal, comprises a cylindrical container closed at its two ends by two respective side walls, and rotatably mounted, with its axis in a horizontal position, in such a way that said axis is substantially located in the plane defined by one of the sides of the cage and that said container closes said side of the cage, said container having a longitudinal opening provided in its peripheral wall for allowing the animal to enter the container, and a longitudinal inner wall parallel to the axis of the container, said inner wall being connected by one of its longitudinal edges to one of the edges of said longitudinal opening of the container, and by at least a portion of its opposite longitudinal edge to the inner wall of said container, so as to define within the container one longitudinal small compartment and one longitudinal large compartment communicating with said longitudinal opening, said inner wall having a longitudinal imperforate portion adjacent said inner wall edges connected to said edge of the longitudinal opening of the container, and a perforated portion extending between said inperforate portion and said opposite end of the inner wall, said device further comprising positioning means for bringing said container into various pre-selected angular positions about the axis of said cylindrical container.

In one embodiment, said positioning means comprise a gear attached to one side wall of the cylindrical container and meshing with a pinion mounted on an axle mounted parallel to the axis of said container.

Said axle comprises, in one embodiment of the invention, a crank-shaped handle for manually actuating the positioning means.

In another embodiment, said axle is actuated by a convenient actuating means, such as a motor.

In still a further embodiment, said opposite edge of said inner wall has a recess constituting a communication aperture between the said two compartments within said container.

Other features and advantages of the invention will become apparent from the description herein-below, which is given by way of example, but not of limitation of the scope of the invention. This description refers to the appended drawings, wherein.

Figure 1:
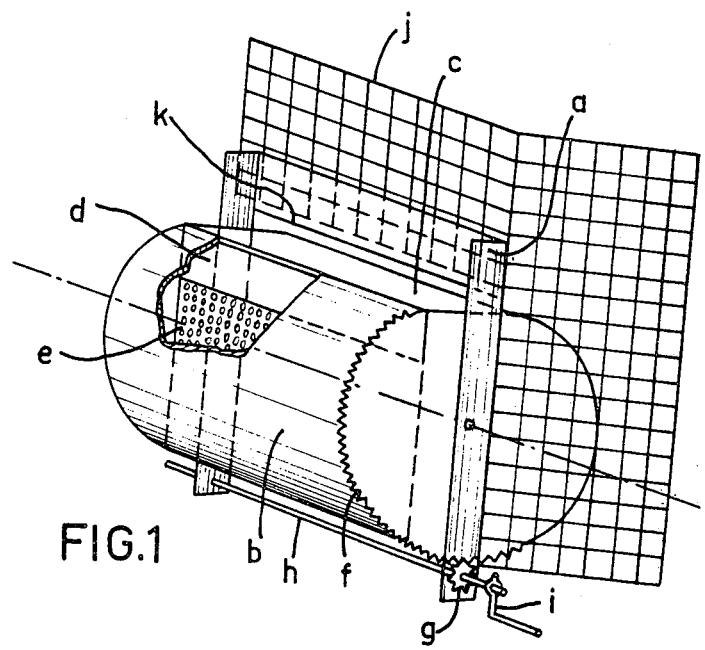
FIG. 1 is a diagrammatic view of the device according to the invention, showing the novel device in combination with a cage adapted to receive an animal such as a chinchilla.

As shown in the drawings, a cage $j$ supports, at one of its sides, a supporting frame $a$ surrounding an opening of said cage side and adapted to receive a cylindrical container $b$ which will be described in detail hereinbelow. Supporting frame $j$ is attached at $k$ to the grating constituting the above-mentioned side of the cage. Container $b$ has two circular side walls provided with central pivots extending axially outside of the container. Said axial pivots are engaged in holes provided in two parallel flange-like portions of frame $a$, in such a manner that the container $b$ is rotated about its longitudinal axis, the arrangement being such that said longitudinal container axis is horizontal. A gear $f$ coaxial with the container is fixed to the latter at a location near one of the side walls of the container. An axle $h$ is rotatably mounted on the above-mentioned flange-like portions of frame $a$ below container $b$ in a position parallel to the axis of the latter. Axle $h$ is provided with a crank-shaped handle $i$ for turning said axle manually. Instead of this crank-shaped handle any convenient means, such as a motor associated with transmission means, may be provided for turning the axle. Furthermore, axle $h$ is provided with a pinion meshing with gear $f$. It will be understood that due to this arrangement, the container $b$ can be rotated in any desired direction by turning axle $h$ e. g. by means of crank-like handle $i$.

Cylindrical container $b$ has a longitudinal opening $c$ defined by two longitudinal edges. One of said edges is connected to one edge of an inner wall $d$, $e$ provided in the container and extending at a distance from the axis of the latter and parallel thereto. The opposite edge of said inner wall is attached to the inner surface of the container, the arrangement being such that inner wall $d$, $e$ defines inside of the container two compartments, one of which is comparatively small while the other is comparatively large, the large compartment being accessible from the outside of the container through the longitudinal opening $c$.

The upper part (in the position shown in FIG. 1) of inner wall is constituted by an imperforate portion $d$, while the remaining, or lower, part is constituted by a perforated wall portion $e$.

It will be easily understood that a plurality of devices of the kind described may be mounted in association with a plurality of cages and actuated by means of a single axle $h$ provided that the cages are arranged in alignment with each other.

In operation, the animal kept in cage $j$ can easily enter through longitudinal opening $c$ the large compartment of the container into which a convenient amount of sand has been previously introduced, provided that by means of actuating axle $h$ the container has been rotated to a position such that the opening c is inside the cage, preferably in the immediate vicinity of the adjacent edge of the aperture of said cage wherein the container is mounted. When the animal has had its sand bath, or a certain number of sand baths, and when consequently the sand is soiled by excretions of the animal, the container is rotated, by means of axle h, to a position wherein longitudinal opening c is outside of the cage, and wherein the inner wall d, e is inclined so that the sand is screened by the perforated wall portion e; the sand flows through the perforations of the inner wall portion e into the small compartment of the container, while the impurities are retained in the large compartment. The container is then rotated to take a position wherein the longitudinal opening c is directed downwardly, outside of the cage, with the inner wall inclined by an angle of e. g. 120° with respect to the vertical, whereby the impurities are evacuated by gravity. The imperforate wall portion d prevents, during this phase, the screened sand from escaping from the small compartment of the container.

When it is desired to replace the sand introduced into the container the latter is rotated in the opposite direction, so that the opening c passes through the inside of the cage, until said opening c is turned substantially downwardly. During this operation, the sand will be entirely accumulated in the large compartment and then, when the opening c has reached the downwardly directed position, be entirely evacuated, and may then be replaced by fresh sand, after bringing the container back into a convenient position wherein the opening c is located in the vicinity of the upper cage opening containing said container, and outside of the latter.

Figure 2:
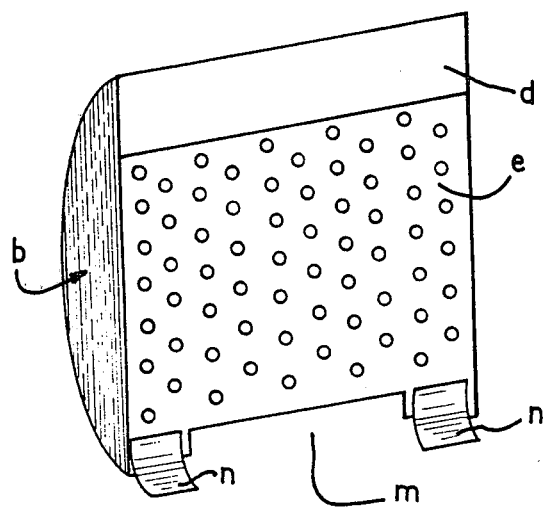
FIG. 2 shows a detail of another embodiment of the device according to the invention, wherein the inner wall of the cylindrical container has a recess constituting a communication aperture between the two compartments defined within said container.

FIG. 2 shows an embodiment of the inner wall, wherein the lower end (as shown) of the perforated portion e has a recess m, while the inner wall is attached to the inside of the container b by convenient means, such as welded brackets n. Recess m is provided for allowing impurities to be evacuated which may have slipped through the perforations during the screening operation and which might be withheld within the small compartment during the evacuation operation if the recess m were not provided.

What is claimed is:

1. A device for keeping chinchilla adapted to be used in combination with a cage having a horizontal floor containing a chinchilla or similar animal, comprising a cylindrical container closed at its two ends by two respective side walls, and rotatably mounted with its axis in a horizontal position, said axis being substantially located in the plane defined by one of the sides of the cage and said container closing said side of the cage, said container having a peripheral wall with a longitudinal opening provided therein for allowing the animal to enter the container, and a longitudinal inner wall parallel to the axis of the container, said inner wall being connected by one of its longitudinal edges to one of the edges of said longitudinal opening of the container, and by at least a portion of its opposite longitudinal edge to the inner wall of said container, so as to define within the container one longitudinal small compartment and one longitudinal large compartment communicating with said longitudinal opening, said inner wall having a longitudinal imperforate portion adjacent said inner wall edges connected to said one edge of the longitudinal opening of the container, and a perforated portion coplanar with said imperforate portion and extending between said imperforate portion and the opposite end of the inner wall, said device further comprising positioning means for bringing said container into various preselected angular positions about said axis thereof.

2. The device of claim 1, wherein said positioning means comprises an axle aligned with said axis, a gear attached to one side wall of the cylindrical container and a pinion coupled to said gear and mounted on said axle.

3. The device of claim 2, wherein said axle has a crank-shaped handle for manually actuating the positioning means.

4. The device of claim 2, further comprising a motor for activating said axle.

5. The device of claim 1, wherein said opposite edge of said inner wall has a recess constituting a communication aperture between the said two compartments within said container.

* * * * *